(12) United States Patent
Watanabe et al.

(10) Patent No.: US 9,111,377 B2
(45) Date of Patent: Aug. 18, 2015

(54) APPARATUS AND METHOD FOR GENERATING A MULTI-VIEWPOINT IMAGE

(71) Applicant: KABUSHIKI KAISHA TOSHIBA, Minato-ku, Tokyo (JP)

(72) Inventors: Wataru Watanabe, Kanagawa-ken (JP); Hisashi Kobiki, Kanagawa-ken (JP); Ryosuke Nonaka, Kanagawa-ken (JP); Masahiro Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 145 days.

(21) Appl. No.: 14/013,821

(22) Filed: Aug. 29, 2013

(65) Prior Publication Data

US 2014/0093158 A1    Apr. 3, 2014

(30) Foreign Application Priority Data

Oct. 2, 2012    (JP) .................................. 2012-220828

(51) Int. Cl.
*G06T 15/00* (2011.01)
*H04N 13/00* (2006.01)

(52) U.S. Cl.
CPC ............ *G06T 15/00* (2013.01); *H04N 13/0007* (2013.01); *H04N 13/0025* (2013.01)

(58) Field of Classification Search
None
See application file for complete search history.

(56) References Cited

U.S. PATENT DOCUMENTS

| | | | |
|---|---|---|---|
| 2013/0071018 A1* | 3/2013 | Kobiki et al. | 382/165 |
| 2013/0083969 A1* | 4/2013 | Tsukada | 382/103 |
| 2013/0251288 A1* | 9/2013 | Kobiki et al. | 382/298 |

FOREIGN PATENT DOCUMENTS

| | | | |
|---|---|---|---|
| JP | 5-233826 | 9/1993 | |
| JP | 8-43783 | 2/1996 | |
| JP | 2005-151534 | 6/2005 | |
| JP | 2010-149234 | * 6/2010 | |
| JP | 2011-85868 | 4/2011 | |
| JP | 2012-53359 | 3/2012 | |
| JP | 2012-060345 | 3/2012 | |
| WO | WO 2012-001949 | 1/2012 | |
| WO | WO 2012001949 A1 * | 12/2012 | ............... G06T 1/00 |

OTHER PUBLICATIONS

JP2011003681 included as an English Machine Translation of Foreign Patent WO 2012001949 A1 (PCT/JP2011/003681).*

(Continued)

*Primary Examiner* — Amir Alavi
*Assistant Examiner* — Alexander J Lesnick
(74) *Attorney, Agent, or Firm* — Nixon & Vanderhye, P.C.

(57) ABSTRACT

According to one embodiment, in an apparatus for generating a multi-viewpoint image, a separation unit separates a target image into a first diffuse reflection image and a first non-diffuse reflection image based on a pixel value of each pixel of the target image. The first non-diffuse reflection image has components except for the first diffuse reflection image. A first estimation unit estimates a change amount of each pixel among a plurality of first non-diffuse reflection images corresponding to viewpoints differently. A first generation unit generates a second non-diffuse reflection image by changing at least one of a shape and a luminance of each pixel of the first non-diffuse reflection image, based on the change amount of each pixel. A synthesis unit generates the multi-viewpoint image by synthesizing the first diffuse reflection image with the second non-diffuse reflection image. Each viewpoint image corresponds to each of the viewpoints.

9 Claims, 11 Drawing Sheets

(56) References Cited

OTHER PUBLICATIONS

C. Tyler, "Binocular Vision", Duane's Foundations of Clinical Ophthalmology, vol. 2, chapter 24, pp. 1-29, 2004.

K. Templin et al., "Highlight Microdisparity for Improved Gloss Depiction", ACM Transactions on Graphics, (Proc. SIGGRAPH) 31(4), 5 pages, 2012.

* cited by examiner

APPARATUS AND METHOD FOR GENERATING A MULTI-VIEWPOINT IMAGE

CROSS-REFERENCE TO RELATED APPLICATION

This application is based upon and claims the benefit of priority from Japanese Patent Application No. 2012-220828, filed on Oct. 2, 2012; the entire contents of which are incorporated herein by reference.

FIELD

Embodiments described herein relate generally to an apparatus and a method for generating a multi-viewpoint image from at least one target image.

BACKGROUND

It is known that a human perceives brightness of the metal and smoothness of the surface of the water from a difference of intensities between reflected lights incident onto the right and left eyes, or a subtle difference between directions of the reflected lights. Conventional technique by using this characteristic is disclosed. Here, by detecting a region speculatively reflected in an image, a position and a size of the region are changed between an image for the right eye and an image for the left eye.

However, in this conventional technique, when the position and the size of the region speculatively reflected are changed, a distortion or a break often occurs on an image newly generated.

DETAILED DESCRIPTION

According to one embodiment, an image processing apparatus generates a multi-viewpoint image from at least one target image. The image processing apparatus includes a separation unit, a first estimation unit, a first generation unit, and a synthesis unit. The separation unit is configured to separate the target image into a first diffuse reflection image and a first non-diffuse reflection image based on a pixel value of each pixel of the target image. The first non-diffuse reflection image has components except for the first diffuse reflection image. The first estimation unit is configured to estimate a change amount of each pixel among a plurality of first non-diffuse reflection images corresponding to viewpoints differently. The first generation unit is configured to generate a second non-diffuse reflection image by changing at least one of a shape and a luminance of each pixel of the first non-diffuse reflection image, based on the change amount of each pixel. The synthesis unit is configured to generate the multi-viewpoint image by synthesizing the first diffuse reflection image with the second non-diffuse reflection image. Each viewpoint image corresponds to each of the viewpoints.

Various embodiments will be described hereinafter with reference to the accompanying drawings.

(The First Embodiment)

As to the image processing apparatus of the first embodiment, an input image (target image) to be processed is separated into an image having pixels due to diffuse reflection of each pixel value (Hereinafter, it is called "diffuse reflection image") and an image having pixels due to other components except for the diffuse reflection (Hereinafter, it is called "non-diffuse reflection image"). The diffuse reflection image represents image components (such as an object's color) of which color and luminance are not changed by a viewpoint position. Furthermore, the non-diffuse reflection image represents image components except for the diffuse reflection image. For example, the image components (such as a gloss or refracted light) are color and luminance changed by the viewpoint position.

The input image includes a pixel value of each pixel. For example, the pixel value is an image having a luminance signal and a color-difference signal based on standard of International Telecommunication Union (Hereinafter, it is called "ITU"). These signals may be based on any of a system to have RGB (three primary colors) components and a system to convert from RGB to the luminance signal and the color-difference signal. In the first embodiment, as one example, the system to have RGB components corresponding to three primary colors based on ITU-RBT 0.601 standard. Accordingly, a pixel value of each pixel in the input image is represented as R-channel having a luminance of red component, G-channel having a luminance of green component, and B-channel having a luminance of blue component. R-channel has discrete pixel values of $0 \sim r_0$, G-channel has discrete pixel value of $0 \sim g_0$, and B-channel has discrete pixel values of $0 \sim b_0$. Moreover, the input image may be a single image or sequential images.

Moreover, in the first embodiment, a method for generating two output images corresponding to two viewpoints (right eye, left eye) from one input image will be explained as an example. However, the method is not limited to this. For example, the output image may be at least three images corresponding to at least three viewpoints. This case is suitable for usage to stereoscopically view by naked eyes. Furthermore, the input image may be a plurality of images, and each image may mutually have a parallax in correspondence with a different viewpoint. In this case, each input image is separated into a diffuse reflection image and non-diffuse reflection image. Furthermore, as one of the output images, the input image may be utilized as it is.

Figure 1:
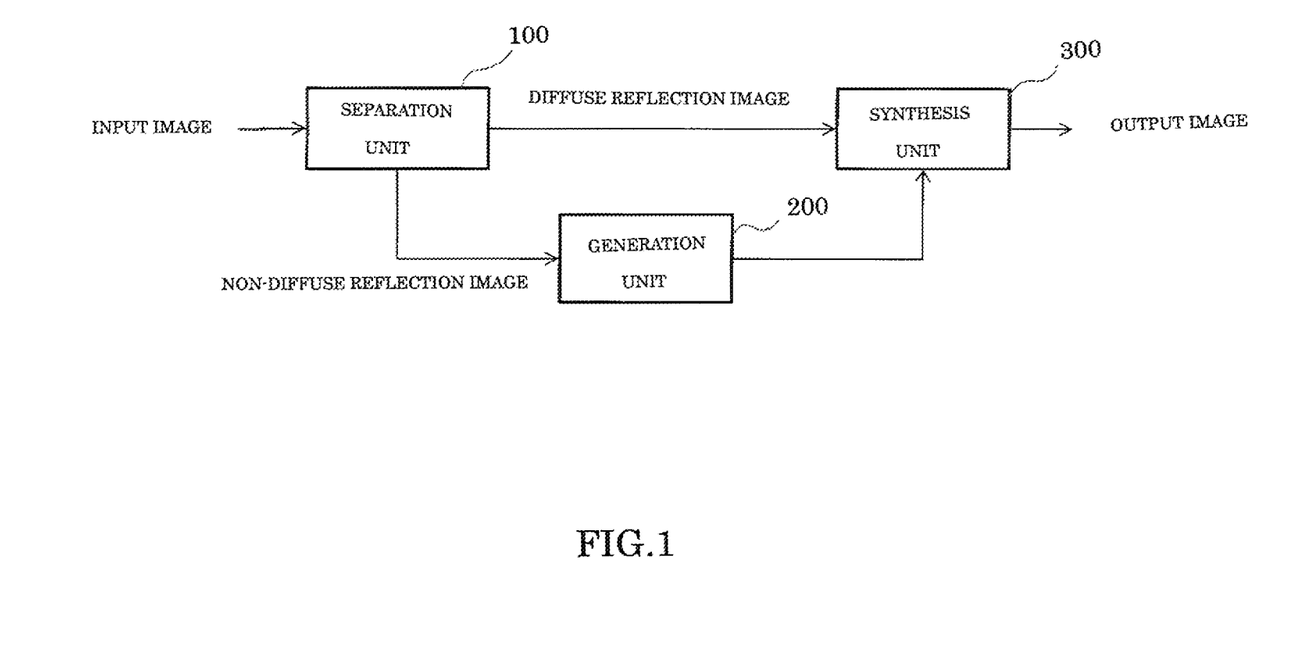
FIG. 1 is a block diagram of an image processing apparatus according to the first embodiment.

FIG. 1 is a block of the image processing apparatus of the first embodiment. The image processing apparatus includes a separation unit 100, a generation unit 200, and a synthesis unit 300.

The separation unit 100 separates the input image (having a pixel value of each pixel) into a diffuse reflection image and non-diffuse reflection image.

The generation unit 200 generates non-diffuse reflection image for right eye and non-diffuse reflection image for left eye by changing the pixel value of each pixel of the non-diffuse reflection image. As to non-diffuse reflection image to be presented to the right eye and non-diffuse reflection image to be presented to the left eye, the pixel value of the non-diffuse reflection image is changed by two different methods.

The synthesis unit 300 synthesizes the diffuse reflection image with the non-diffuse reflection image for right eye and the non-diffuse reflection image for left eye respectively, and generates an output image corresponding to each viewpoint. Specifically, by adding the non-diffuse reflection image for right eye and the non-diffuse reflection image for left eye to the diffuse reflection image respectively, two images to be presented to the right eye and the left eye are generated.

Figure 2:
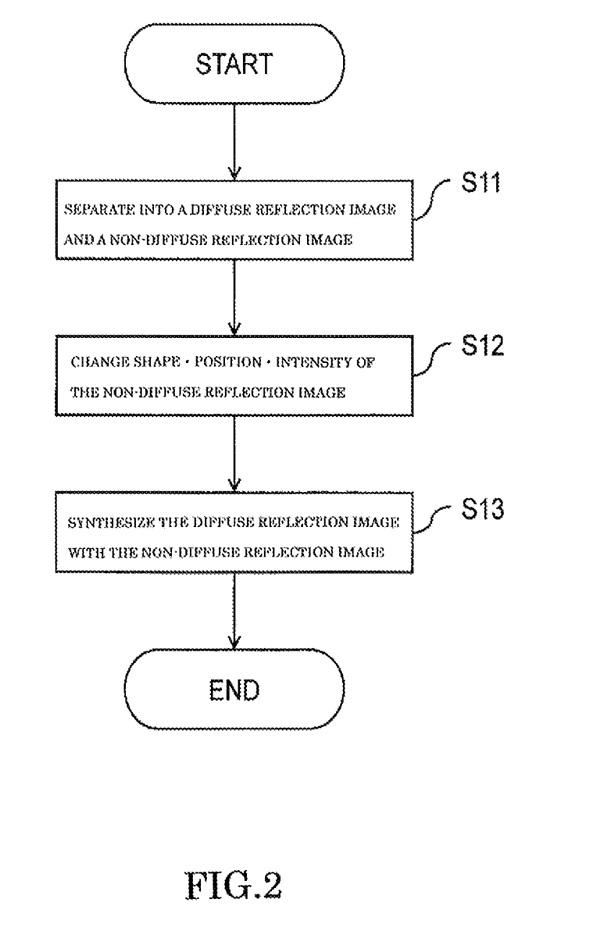
FIG. 2 is a flow chart of processing of the image processing apparatus according to the first embodiment.

Next, operation to generate the images according to the first embodiment is explained. FIG. 2 is a flow chart of operation of the image processing apparatus of the first embodiment.

The separation unit 100 separates an input image I into a diffuse reflection image and non-diffuse reflection image (S11). In the first embodiment, a method for separating into the diffuse reflection image and the non-diffuse reflection image based on dichromatic reflection model is used. Briefly, the non-diffuse reflection image is regarded as a specular reflection image. However, the non-diffuse reflection image is not limited to the specular reflection image. For example, separation may be performed by using a model in which a refracted light or a subsurface scattered light can be taken into consideration.

A light incident onto an object (subject) is reflected via two physical different paths. One is reflected on a boundary of the surface of the object, which is called "specular reflection". The other is due to scattering of light incident onto uneven surface of the object, which is called "diffuse reflection". The diffuse reflection includes a color of the surface of the object itself different from a color of the light source. Assume that reflection characteristic of the object in the input image I is based on dichromatic reflection model. I is represented by following equation (1).

$$I = I^{diff} + I^{spec} \quad (1)$$

In the equation (1), $I^{diff}$ represents the diffuse reflection image and $I^{spec}$ represents the specular reflection image. Here, RGB values $C_R$, $C_G$ and $C_B$ of each pixel of the image are represented by following equation (2).

$$\begin{pmatrix} C_R \\ C_G \\ C_B \end{pmatrix} = \alpha \times \begin{pmatrix} D_R \\ D_G \\ D_B \end{pmatrix} + \beta \times \begin{pmatrix} S_R \\ S_G \\ S_B \end{pmatrix} \quad (2)$$

In the equation (2), $D_R$, $D_G$ and $D_B$ represent RGB values of diffuse reflection characteristic, $S_R$, $S_G$ and $S_B$ represent RGB values of specular reflection characteristic, $\alpha$ represents diffuse reflection coefficient, and $\beta$ represents specular reflection coefficient. In order to calculate $I^{diff}$ and $I^{spec}$ from the input image I, "$D_R$, $D_G$ and $D_B$ with $\alpha$", "$S_R$, $S_G$ and $S_B$ with $\beta$", are respectively calculated for each pixel. Hereinafter, one example of the method for calculating will be explained.

First, values of $S_R$, $S_G$ and $S_B$ are determined on assumption that color ratio thereof is "1:1:1". Briefly, the illumination color is assumed as white. Next, values of $D_R$, $D_G$ and $D_B$ are calculated from a set having similar hue among pixel values of around pixels. Furthermore, by solving the equation (2) with $D_R$, $D_G$ and $D_B$ estimated, $\alpha$ and $\beta$ are calculated. As mentioned-above, values necessary to calculate $I^{diff}$ and $I^{spec}$ are calculated, and the input image is separated.

The generation unit 200 generates non-diffuse reflection image $I'^{spec}_L$ for left eye and non-diffuse reflection image $I'^{spec}_R$ for right eye, based on $I^{spec}$ (S12). Here, difference is set between $I'^{spec}_L$ and $I'^{spec}_R$. For example, as shown in an equation (3), by subjecting $I^{spec}$ to gamma transform with two different gamma values, two images $I'^{spec}_L$ and $I'^{spec}_R$ are generated. A difference of luminance is set between $I'^{spec}_L$ and $I'^{spec}_R$.

$$I'^{spec}_L = (I^{spec})^{\gamma L}$$

$$I'^{spec}_R = (I^{spec})^{\gamma R} \quad (3)$$

A method for setting the difference between $I'^{spec}_L$ and $I'^{spec}_R$ is not limited to above-mentioned method. For example, by changing a parameter to enlarge/reduce, the difference may be set between $I'^{spec}_L$ and $I'^{spec}_R$. Alternatively, by using non-linear transform by morphing, the shape may be changed. In latter case, specifically, following method may be used.

By dividing a specular reflection image into each gloss region, the difference may be set between $I'spec_L$ and $I'^{spec}_R$. In order to divide the specular reflection image into each gloss region, by binarizing the specular reflection image with some threshold, labeling processing may be applied. Furthermore, a conventional method for dividing into regions may be used. By centering a center of gravity of the gloss region divided, and by enlarging or reducing the size of gloss region of $I'^{spec}_L$ and $I'^{spec}_R$ with different enlargement/reduction ratio respectively, a difference of gloss can be set between two output images for right eye and left eye. Alternatively, by morphing, a part of the gloss region of $I'^{spec}_L$ may be enlarged, and, conversely, a part of the gloss region of $I'^{spec}_R$ may be reduced.

The synthesis unit 300 synthesizes the diffuse reflection image $I^{diff}$ with $I'^{spec}_L$ and $I'^{spec}_R$, and generates an image for left eye $I'_L$ and an image for right eye $I'_R$ (S13). In the first embodiment, by assuming the dichromatic reflection model, an output image is generated according to an equation (4).

$$I'_L = I^{diff} + I'^{spec}_L$$

$$I'_R = I^{diff} + I'^{spec}_R \quad (4)$$

In conventional technique, a position and a size of the specular reflection region are changed without distinguishing between the diffuse reflection image and non-diffuse reflection image (specular reflection image). Accordingly, when the size and the position of glosses are changed, the diffuse reflection image is influenced thereby, and a distortion or a break often occurs in the image generated.

In the first embodiment, by separating an image component (in an input image) changeably viewed according to a person's viewpoint, signal values of this image component are changed. After that, this image component is synthesized with other image components in the input image. Accordingly, change executed to the non-diffuse reflection image does not degrade the diffuse reflection image. As a result, an image of which quality such as brightness is improved can be generated.

(The Second Embodiment)

The second embodiment relates to an apparatus for generating at least two output images (mutually having parallax) for stereoscopic vision from the input image.

Figure 3:
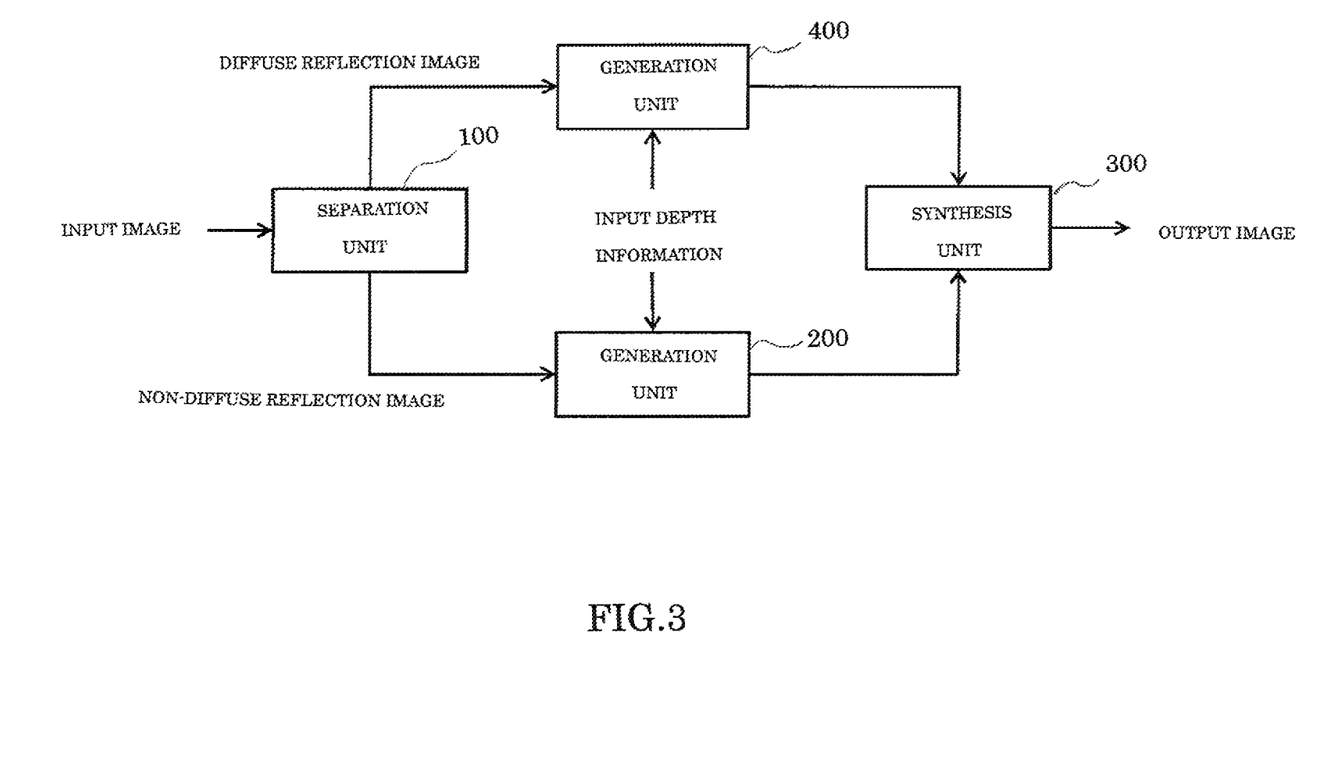
FIG. 3 is a block diagram of the image processing apparatus according to the second embodiment.

FIG. 3 is a block diagram of an image processing apparatus according to the second embodiment. The image processing apparatus includes the separation unit 100, the generation unit 200, the synthesis unit 300, and a generation unit 400. The generation unit 400 generates a parallax image based on depth information of the input image.

Figure 4:
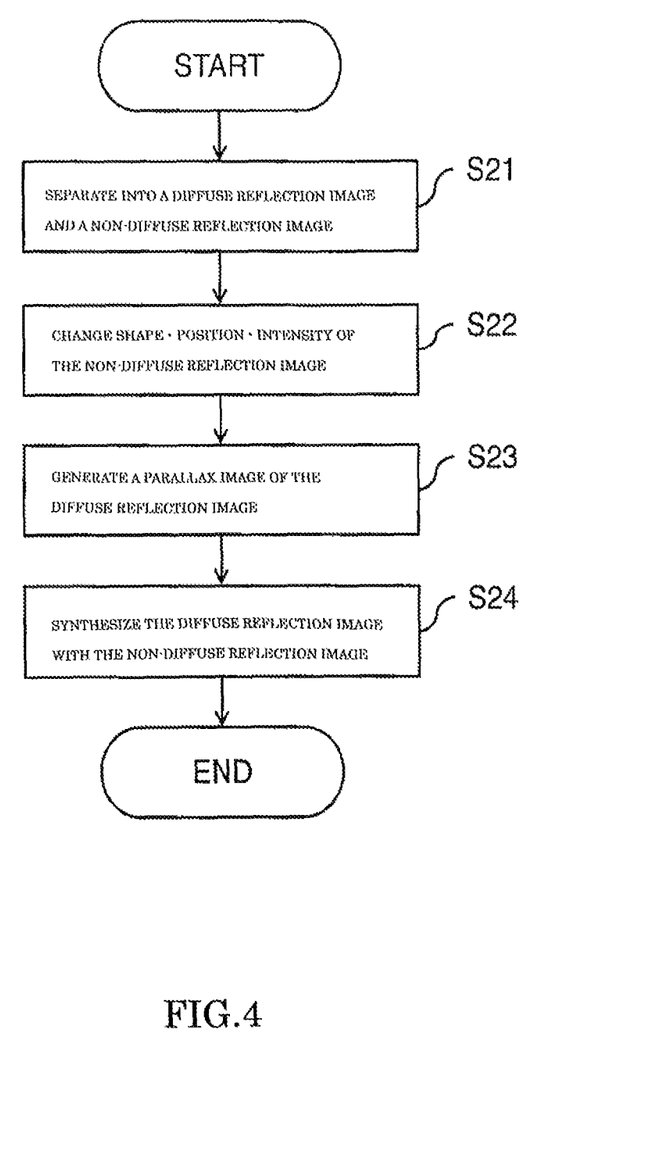
FIG. 4 is a flow chart of processing of the image processing apparatus according to the second embodiment.

Next, image generation operation of the second embodiment will be explained. FIG. 4 is a flow chart of processing of the image processing apparatus of the second embodiment. Hereinafter, the case that the input image is one and depth information is inputted will be explained as an example. Furthermore, a component that the diffuse reflection image and non-diffuse reflection image (in the input image) are separated and parallax is assigned to respective images based on the depth information will be explained. However, the second embodiment is not limited to this component. Input information may be a parallax vector. Furthermore, after an image to which parallax is assigned based on the depth information is generated, the diffuse reflection image and non-diffuse reflection image (in the image to which parallax is assigned) may be separated. Furthermore, depth information may be estimated without inputting the depth information (component thereof is not shown in FIG. 3). In this case, if the depth information is estimated based on the diffuse reflection image, estimation accuracy thereof is improved.

Moreover, in following explanation, the depth information is represented as $I^{depth}$. $I^{depth}$ holds depth information of each pixel in the input image I. Here, a depth corresponding to each pixel is represented as $Z_f$. A range of $Z_f$ is $0 \leq Z_f \leq Z$ (For example, Z=1.0), 0 represents the front side, and Z represents the back side.

Based on the depth information $I^{depth}$ and the diffuse reflection image $I^{diff}$ (by the separation unit 100), the generation unit 400 generates a parallax image (S23). Specifically, a parallax vector d is calculated from the depth information $I^{depth}$, and each pixel of the diffuse reflection image $I^{diff}$ based on the parallax vector d. Hereinafter, one example of a method for generating the parallax image will be explained in detail.

Figure 5:
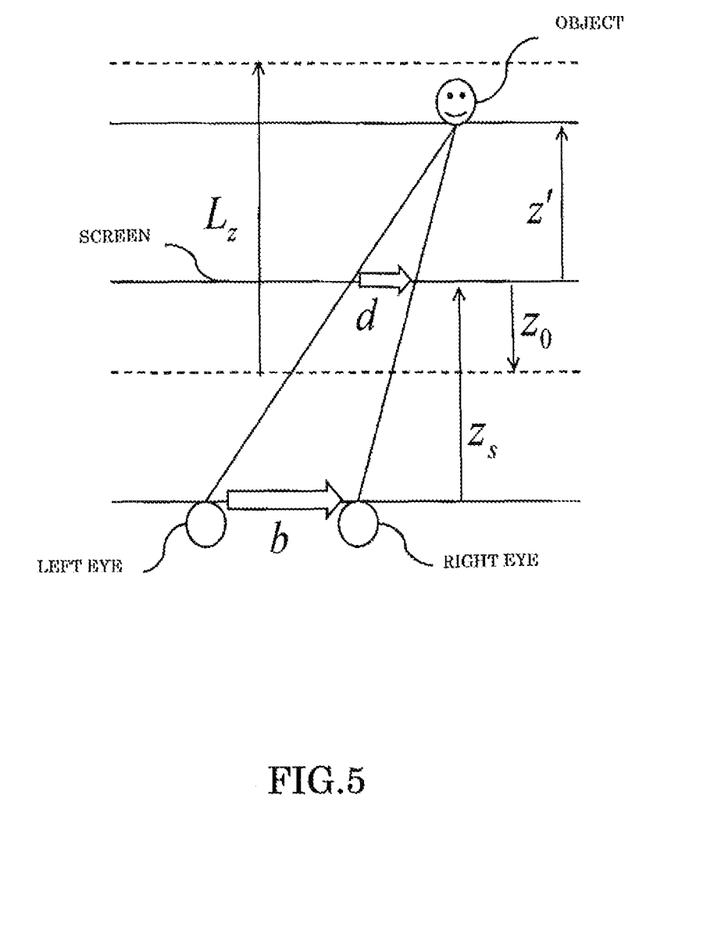
FIG. 5 is a schematic diagram to explain a method for estimating a parallax vector.

FIG. 5 is a schematic diagram to explain the method for calculating a parallax vector from the depth information. Here, b [cm] is a distance between both eyes, $z_s$ [cm] is a distance to the screen, $Z_o$ [cm] is a maximum projection distance from the screen to a foreground, and $L_z$ [cm] is a depth distance in actual space. Parameters b, $Z_s$, $Z_o$ and $L_z$ can be arbitrarily determined based on stereoscopic vision to be presented. Here, the parallax vector d is calculated according to an equation (5).

$$d = b\{z'/(z_s + z')\}$$

$$z' = L_z z_f / Z - z_o \quad (5)$$

The parallax image is generated by moving pixel values of the diffuse reflection image according to the parallax vector d. An image for left eye and an image for right eye (generated by moving the pixel values) are represented as $I'^{diff}_L$ and $I'^{diff}_R$ respectively. When the parallax image is generated, as to a region to which pixel values are not assigned, the pixel values to assign to the region are interpolated by other pixel values around the region.

In the same way as the first embodiment, the generation unit 200 generates non-diffuse reflection image for left eye $I'^{spec}_L$ and non-diffuse reflection image for right eye $I'^{spec}_R$ from the specular reflection image $I^{spec}$. In this case, by referring to the depth information $I^{depth}$, the generation unit 200 generates $I'^{spec}_L$ and $I'^{spec}_R$. For example, as shown in the equation (3), after the luminances are changed, in the same way as the generation unit 400, a parallax is assigned to $I'^{spec}_L$ and $I'^{spec}_R$. As a result, the stereoscopic vision can be reappeared while a difference of the luminance is set between $I'^{spec}_L$ and $I'^{spec}_R$.

The synthesis unit 300 synthesizes the diffuse reflection image $I'^{diff}_L$ with the specular reflection image $I'^{spec}_L$, and generates the image for left eye $I'_L$. In the same way, the synthesis unit 300 synthesizes the diffuse reflection image $I'^{diff}_R$ with the specular reflection image $I'^{spec}_R$, and generates the image for right eye $I'_R$ (S25). In the second embodiment, by assuming the dichromatic reflection model, in the same way as the equation (4), two (diffuse, specular) reflection images are synthesized according to an equation (6).

$$I'_L = I'^{diff}_L + I'^{spec}_L$$

$$I'_R = I'^{diff}_R + I'^{spec}_R \quad (6)$$

According to the second embodiment, from the input image and the depth information, a stereoscopic viewable image of which quality such as brightness is improved can be generated.

(The Third Embodiment)

The third embodiment relates to an apparatus for generating output images corresponding to viewpoints different from the input image. In the third embodiment, an example that output images corresponding to at least three viewpoints are generated from input images corresponding to two viewpoints will be explained. Moreover, the third embodiment is not limited to this example. The number of input images may be larger than (or equal to) two.

Figure 6:
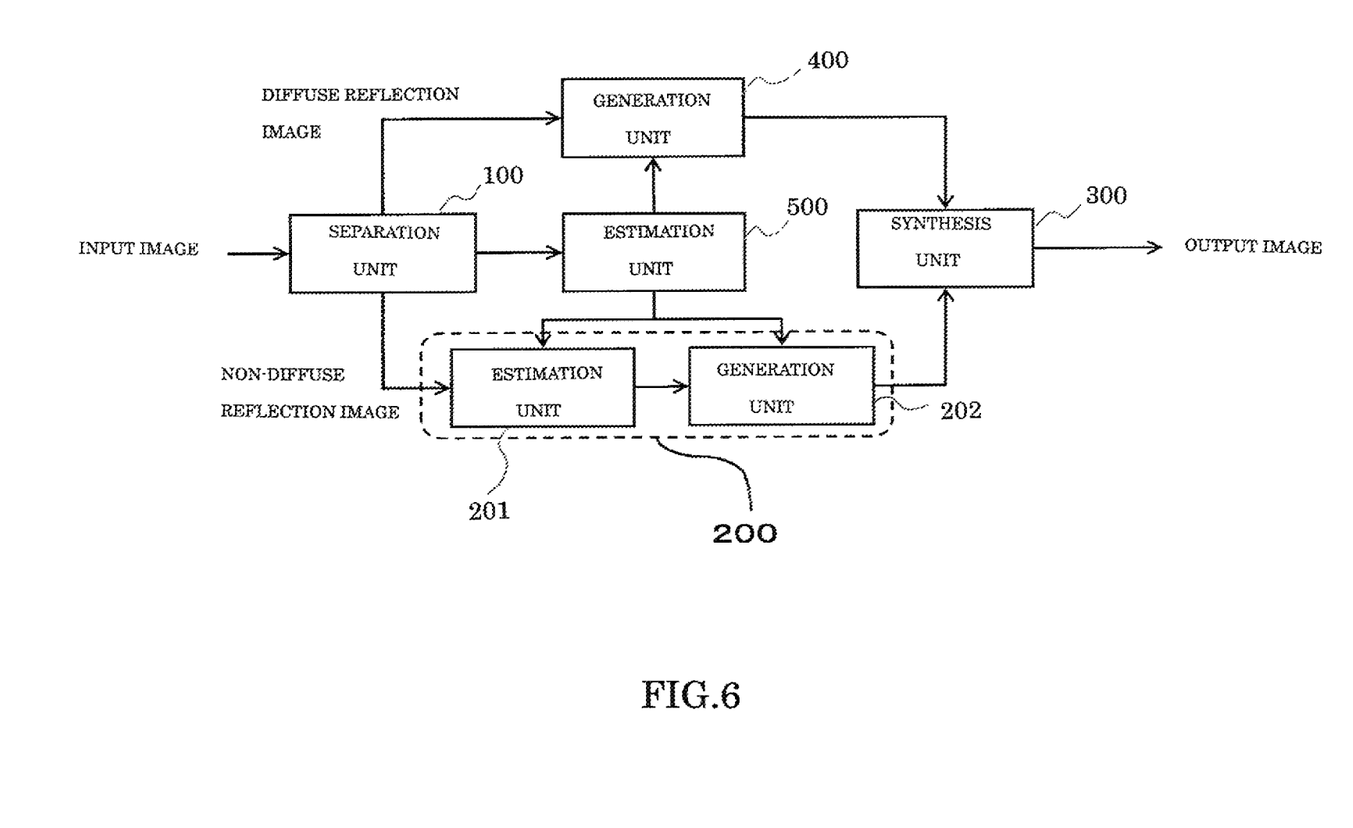
FIG. 6 is a block diagram of the image processing apparatus according to the third embodiment.

FIG. 6 is a block diagram of an image processing apparatus according to the third embodiment. The image processing apparatus includes an estimation unit 201, a generation unit 202, and an estimation unit 500. The estimation unit 201 estimates/extracts a change of non-diffuse reflection image among a plurality of input images. The generation unit 202 generates non-diffuse reflection image corresponding to an arbitrary viewpoint by using the change of non-diffuse reflection image (estimated by the estimation unit 201). The estimation unit 500 estimates a depth from at least two input images.

Figure 7:
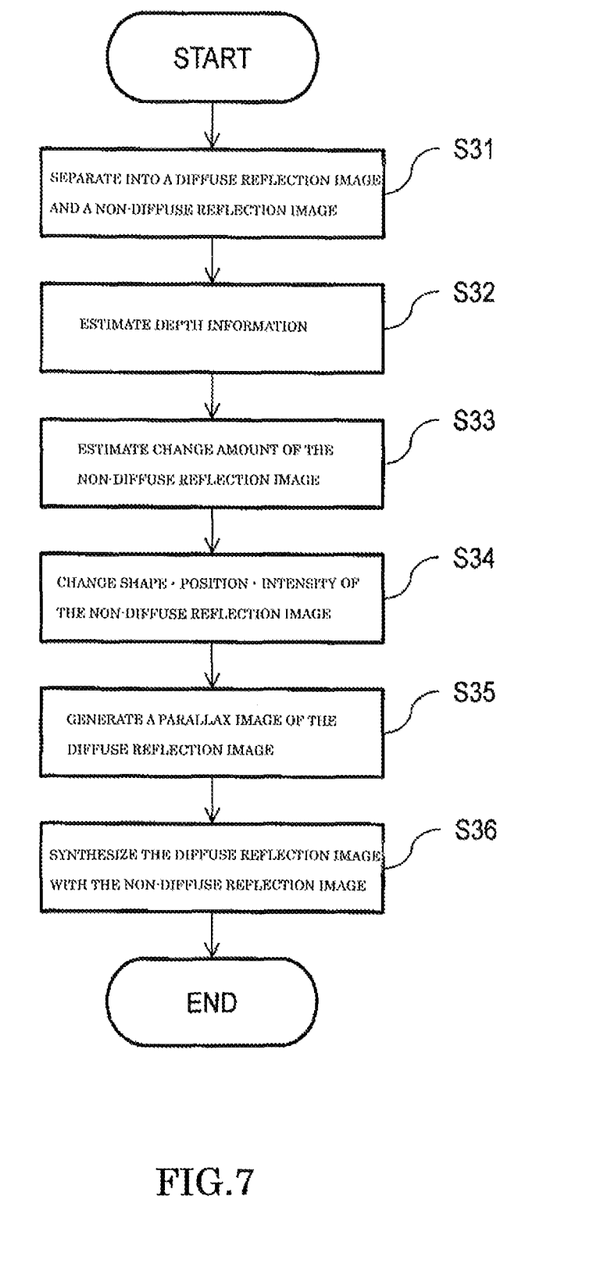
FIG. 7 is a flow chart of processing of the image processing apparatus according to the third embodiment.
Figure 8:
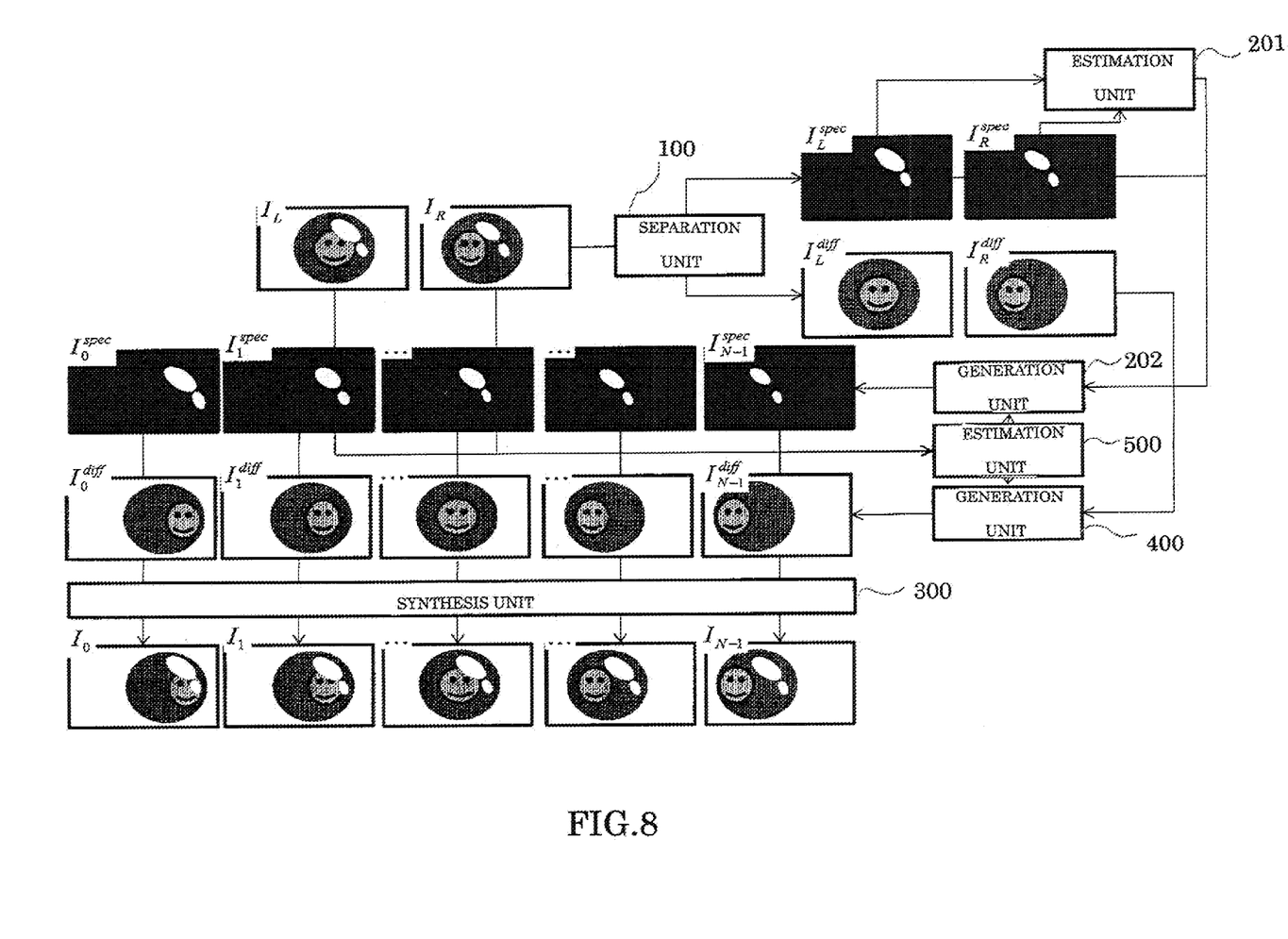
FIG. 8 is a schematic diagram to explain all operation of the image processing apparatus according to the third embodiment.

FIG. 7 is a flow chart of processing of the image processing apparatus according to the third embodiment. FIG. 8 is a schematic diagram to explain all operation of the image processing apparatus in case that the input image is (two) stereo images. Here, in the stereo images inputted, an image for left eye is $I_L$, and an image for right eye is $I_R$. Respective diffuse reflection images separated from the stereo images (by the separation unit 100) are $I_L^{diff}$ and $I_R^{diff}$. Furthermore, respective specular reflection images are $I_L^{spec}$ and $I_R^{spec}$.

Figure 9:
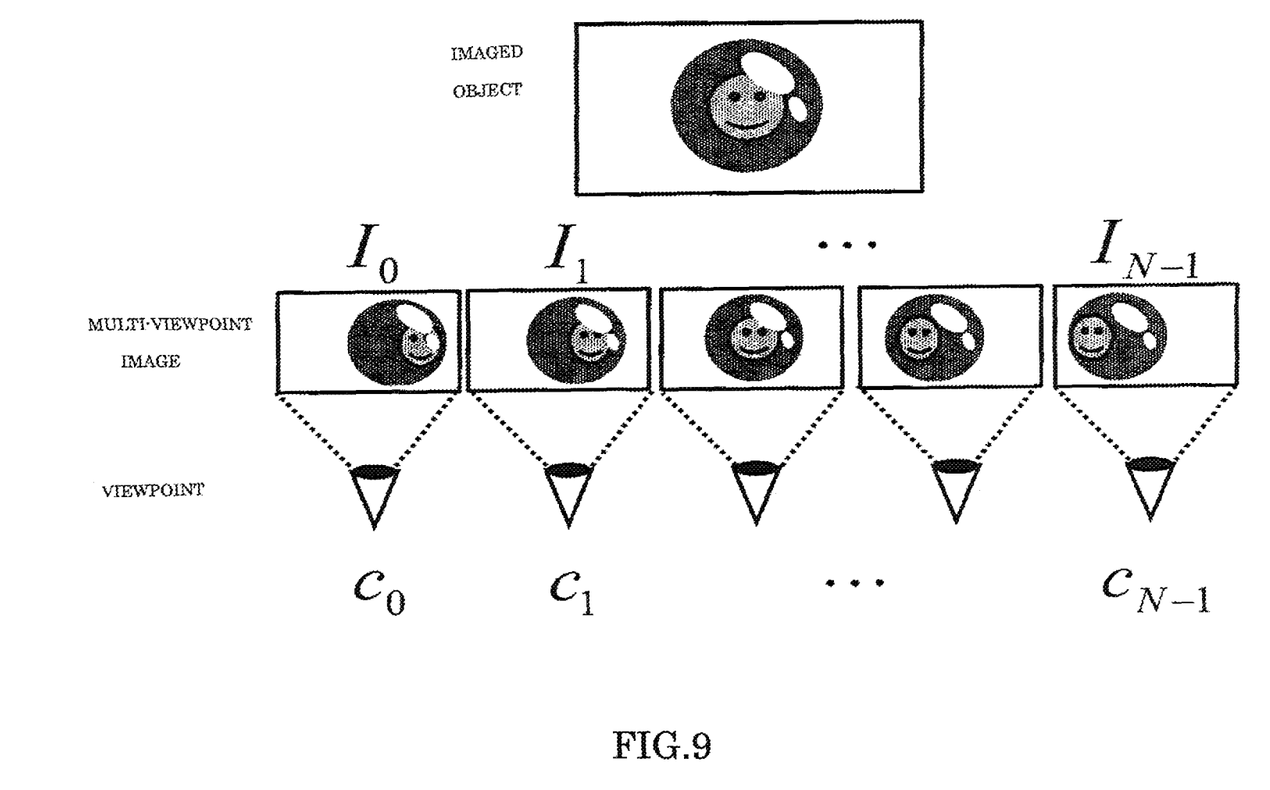
FIG. 9 is a schematic diagram to explain a relationship between a viewpoint position and the image according to the third embodiment.

The generation unit 200 estimates/extracts a change amount of the image among $I_L^{spec}$ and $I_R^{spec}$, and generates a specular reflection image corresponding to an arbitrary viewpoint based on the change amount. Here, as shown in FIG. 9, viewpoints are horizontally aligned at an equal interval. However, the viewpoints are not limited to this alignment. In FIG. 9, the number of viewpoints is N, the viewpoints are $C_0, \ldots, C_{N-1}$, and images corresponding to the viewpoints are $I_0, \ldots, I_{N-1}$.

The estimation unit 500 estimates depth information $I^{depth}$ from $I_L$ and $I_R$ (S32). In the third embodiment, the depth information is estimated by the stereo matching method. However, a method for estimating the depth information is not limited to this method.

The estimation unit 201 estimates a change amount between $I_L^{spec}$ and $I_R^{spec}$, and extracts the change amount to generate $I^{spec}_0, \ldots, I^{spec}_{N-1}$ (S33). Here, the change amount is represented as F. In the third embodiment, a correspondence relationship of pixels between $I_L^{spec}$ and $I_R^{spec}$, and the correspondence vector can be extracted as F. Hereinafter, one example of a method for extracting F by using the correspondence relationship of pixels between $I_L^{spec}$ and $I_R^{spec}$ will be explained.

Figure 10:
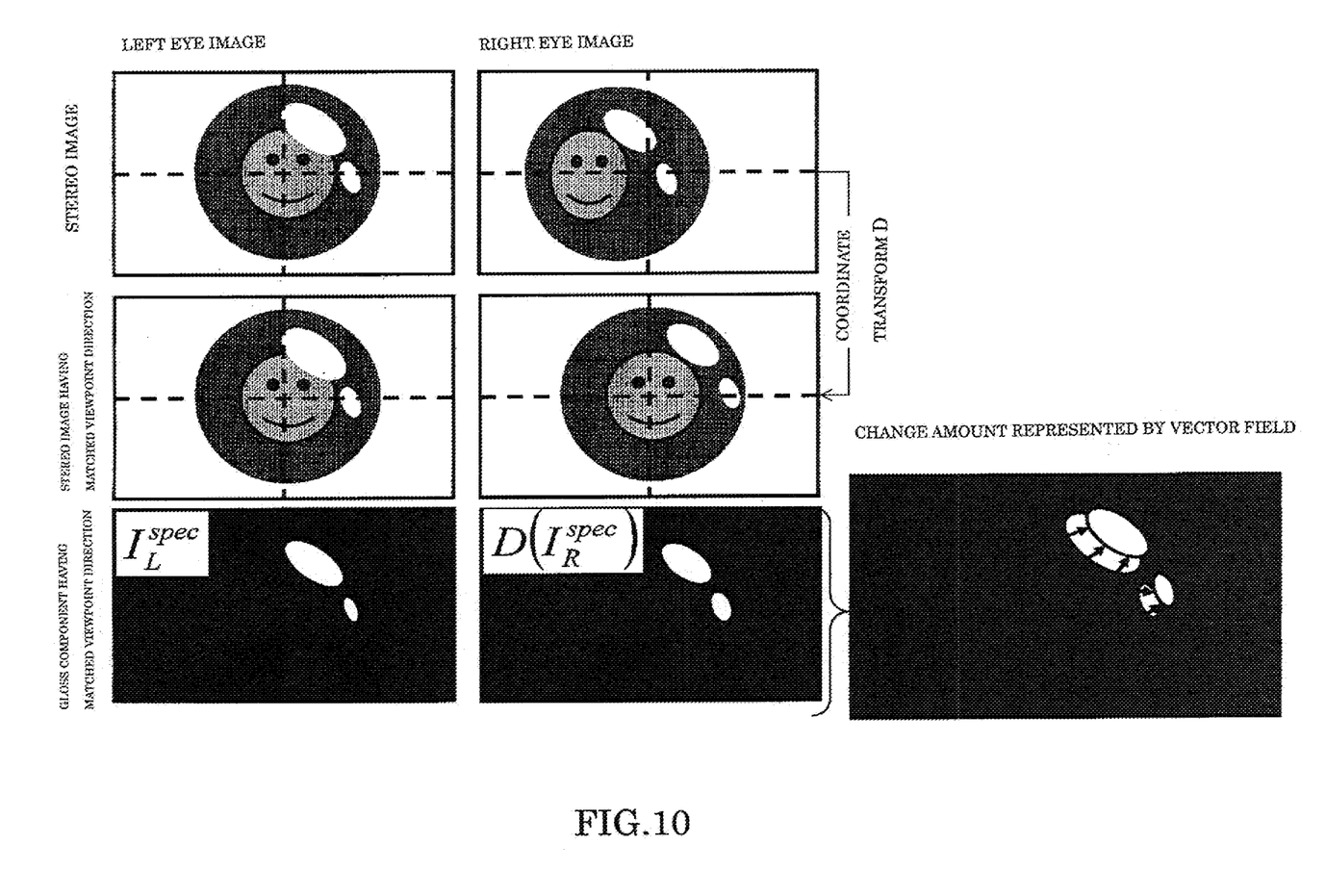
FIG. 10 is a schematic diagram to explain a method for estimating/extracting a change amount of gloss between viewpoints according to the third embodiment.

FIG. 10 shows one example of the method for extracting F by using the correspondence relationship between pixels. In this example, as to following two aspects (1) and (2), the correspondence relationship between two input images is thought about.

(1) Difference between two images due to a camera coordinate system (viewpoint position when stereo images are photographed):

(2) Difference between two images due to difference of reflected lights depending on a viewpoint position:

First, as to an image for right eye $I_R$, by subjecting $I_R$ to a camera coordinate transform to match the viewpoint position with an image for left eye $I_L$, the acquired image D ($I_R$) is thought about. The camera coordinate transform D is calculated by using a parallax vector (acquired from the depth information). In this case, as shown in FIG. 10, between $I_L$ and D ($I_R$), the diffuse reflection images thereof coincide. However, the specular reflection images thereof do not coincide. In this way, after the viewpoint position is matched between $I_R$ and $I_L$, a difference of images between $I_R$ and $I_L$ is extracted as the change amount F.

The difference of images between $I_R$ and $I_L$ depends on the specular reflection image only. Accordingly, by transforming $I_R^{spec}$ so that the camera coordinate system is matched with $I_L^{spec}$, an image D ($I_R^{spec}$) is generated. Next, by using $I_L^{spec}$ and D ($I_R^{spec}$), the change amount F is estimated. Hereinafter, a method for estimating the change amount F will be explained.

By setting a difference of pixel values between $I_L^{spec}$ and D ($I_R^{spec}$) to F, a change amount of luminance of gloss for each pixel can be estimated.

Furthermore, by setting a vector field of a correspondence relationship of pixels between $I_L^{spec}$ and D ($I_R^{spec}$) to F, a shape change amount of gloss for each viewpoint can be estimated. In order to estimate the correspondence relationship between two images, an optical flow is used. As the method for estimating the correspondence relationship, not only the optical flow but also any conventional method may be used.

The generation unit 202 generates specular reflection images $I^{spec}_0, \ldots, I^{spec}_{N-1}$ of images $I_0, \ldots, I_{N-1}$ (S34). First, the generation unit 202 transforms the images $I_0, \ldots, I_{N-1}$ by using the change amount F. When a change amount of luminance of gloss is used, as shown in an equation (7), a multiple of constant of the change amount F is added.

$$I^{spec}_n = I_L^{spec} + a*F \quad (7)$$

In the equation (7), if $I^{spec}_n$ is smaller than (or equal to) zero, pixel values thereof is zero. Here, "a" is a coefficient of the multiple of constant. For example, by enlarging absolute value of "a" according to a distance between the viewpoint position and the center position, change of light intensity due to the viewpoint can be represented.

Figure 11:
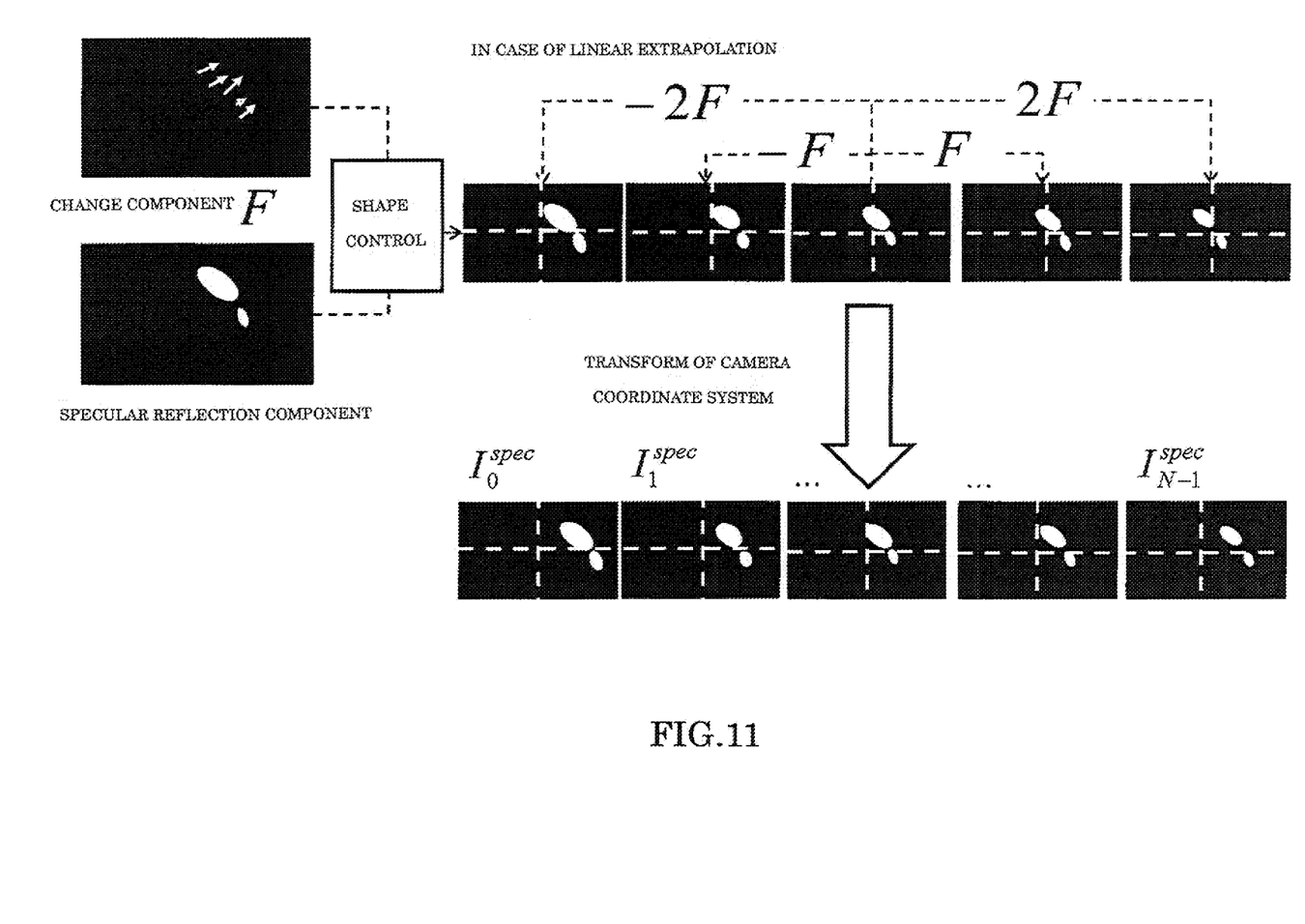
FIG. 11 is a schematic diagram to explain a method for generating a multi-viewpoint image using the change amount according to the third embodiment.

Furthermore, when the shape change amount of gloss is used, as shown in upper part of FIG. 11, by moving each pixel value of $I_L^{spec}$ based on the vector field of F, an image of which specular reflection image is enlarged/reduced/transformed is generated. In this case, by multiplying a change amount with constant according to a distance between the viewpoint position and the center position, the specular reflection image gradually enlarging is represented. Above-mentioned two methods, i.e., a method by difference of luminance and a method by difference of shape, may be used by combining.

A method for generating $I^{spec}_0, \ldots, I^{spec}_{N-1}$ by multiple constant of F is one example. As to F, the image may be generated by non-linear extrapolation.

Next, by referring to the depth information, the generation unit 202 assigns a parallax to $I^{spec}_0, \ldots, I^{spec}_{N-1}$. In the same way as operation of the generation unit 200 of the second embodiment, by calculating a parallax vector from the depth information and by moving pixel values based on the parallax vector, the parallax can be assigned.

In the same way as the second embodiment, based on the depth information, the generation unit 400 generates parallax images $I^{diff}_0, \ldots, I^{diff}_{N-1}$ from the diffuse reflection image $I_L^{diff}$ (S35).

The synthesis unit 300 synthesizes diffuse reflection images $I^{diff}_0, \ldots, I^{diff}_{N-1}$ with specular reflection images $I^{spec}_0, \ldots, I^{spec}_{N-1}$ respectively, and generates $I_0, \ldots, I_{N-1}$ (S36). In the third embodiment, by assuming the dichromatic reflection model, in the same way as the equation (6), two (diffuse, specular) reflection images are synthesized.

According to the third embodiment, a stereoscopic image corresponding to multi-viewpoint is generated from stereo images, and fell of the material (such as brightness) can be improved. In case of assuming the dichromatic reflection model, even if the specular reflection image is changed by change of the viewpoint position, the pixel values are not smaller than (or equal to) pixel values of the diffuse reflection image. However, if the diffuse reflection image is not estimated, it cannot be decided whether the pixel values are smaller than (or equal to) pixel values of the diffuse reflection image. Accordingly, physical incorrect change may be allowed.

On the other hand, in the third embodiment, a diffuse reflection color of each pixel is separated from a specular reflection color of the pixel. Accordingly, above-mentioned failure does not occur. Furthermore, in the same way as the first and second embodiments, change executed to the non-diffuse reflection image does not degrade the diffuse reflection image. Furthermore, when a difference of the non-diffuse reflection image is set between two images for right eye and left eye, the change amount is estimated from the image. Accordingly, an image having more natural quality can be generated.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for generating a multi-viewpoint image from at least one target image, comprising:
 a processor configured to:
  separate the target image into a first diffuse reflection image and a first non-diffuse reflection image based on a pixel value of each pixel of the target image, the first non-diffuse reflection image having components except for the first diffuse reflection image;

estimate a change amount of each pixel among a plurality of first non-diffuse reflection images corresponding to viewpoints differently;

generate a second non-diffuse reflection image by changing at least one of a shape and a luminance of each pixel of the first non-diffuse reflection image, based on the change amount of each pixel; and generate the multi-viewpoint image by synthesizing the first diffuse reflection image with the second non-diffuse reflection image, each viewpoint image corresponding to each of the viewpoints.

2. The apparatus according to claim 1, wherein the processor is configured to transform the plurality of first non-diffuse reflection images into a coordinate system having the same viewpoint, and to estimate the change amount from a correspondence relationship of each pixel among the plurality of first non-diffuse reflection images transformed.

3. The apparatus according to claim 1, wherein the processor is configured to generate a plurality of first diffuse reflection images from pixel values of a plurality of target images corresponding to the viewpoints differently and to estimate the change amount from a correspondence relationship of each pixel among the plurality of first diffuse reflection images.

4. The apparatus according to claim 1, wherein the processor is configured to estimate a depth information from the first diffuse reflection image of the target image.

5. The apparatus according to claim 1, wherein the multi-viewpoint image includes the target image.

6. The apparatus according to claim 1, wherein the processor is configured to generate the multi-viewpoint image by synthesizing the first diffuse reflection image with the plurality of first non-diffuse reflection images having pixels of which at least one of the shape and the luminance is changed based on the change amount of each pixel.

7. The apparatus according to claim 1, wherein the processor is configured to transform the signal value of the first non-diffuse reflection image by a plurality of gamma values respectively, and the transformed signal value is used for generating a synthesized image to be presented to the viewpoints respectively.

8. The apparatus according to claim 1, wherein the processor is configured to detect a region of which the signal value of the first diffuse reflection image is larger than a specific threshold, and to change at least one of a size and a position of the region.

9. A method for generating a multi-viewpoint image from at least one target image, comprising:

separating by a processor, the target image into a first diffuse reflection image and a first non-diffuse reflection image based on a pixel value of each pixel of the target image, the first non-diffuse reflection image having components except for the first diffuse reflection image;

estimating by the processor, a change amount of each pixel among a plurality of first non-diffuse reflection images corresponding to viewpoints differently;

generating by the processor, a second non-diffuse reflection image by changing at least one of a shape and a luminance of each pixel of the first non-diffuse reflection image, based on the change amount of each pixel; and generating by the processor, the multi-viewpoint image by synthesizing the first diffuse reflection image with the second non-diffuse reflection image, each viewpoint image corresponding to each of the viewpoints.

\* \* \* \* \*